(12) United States Patent
Hatta (10) Patent No.: US 11,491,744 B2
(45) Date of Patent: Nov. 8, 2022

(54) METHOD FOR MANUFACTURING FIBER REINFORCED RESIN MOLDED ARTICLE, AND MANUFACTURING DEVICE THEREOF

(71) Applicant: TOYOTA JIDOSHA KABUSHIKI KAISHA, Toyota (JP)

(72) Inventor: Ken Hatta, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 86 days.

(21) Appl. No.: 17/123,613

(22) Filed: Dec. 16, 2020

(65) Prior Publication Data

US 2021/0221071 A1   Jul. 22, 2021

(30) Foreign Application Priority Data

Jan. 17, 2020   (JP) .............................. JP2020-006312

(51) Int. Cl.
  *B29C 70/34*   (2006.01)
  *B29C 70/84*   (2006.01)
  *B29C 70/54*   (2006.01)
  B29K 101/10   (2006.01)

(52) U.S. Cl.
  CPC .............. *B29C 70/34* (2013.01); *B29C 70/54* (2013.01); *B29C 70/84* (2013.01); *B29K 2101/10* (2013.01)

(58) Field of Classification Search
  CPC ......... B29C 70/34; B29C 70/78; B29C 70/84; B29C 70/467; B29C 70/462; B29C 70/446
  See application file for complete search history.

(56) References Cited

U.S. PATENT DOCUMENTS

| 3,028,284 | A | * | 4/1962 | Reeves | .................. | B29C 70/48 |
| | | | | | | 156/215 |
| 3,612,387 | A | * | 10/1971 | Rathbun | .............. | B23K 1/0014 |
| | | | | | | 228/6.1 |
| 3,902,944 | A | * | 9/1975 | Ashton | ................. | B29C 53/824 |
| | | | | | | 416/241 A |
| 5,259,901 | A | * | 11/1993 | Davis | .................... | B29C 70/446 |
| | | | | | | 156/154 |
| 2019/0084249 | A1 | | 3/2019 | Hatta | | |
| 2019/0152104 | A1 | | 5/2019 | Baba | | |

FOREIGN PATENT DOCUMENTS

JP   2019-056415 A   4/2019
JP   2019-093700 A   6/2019

* cited by examiner

*Primary Examiner* — Matthew J Daniels
(74) *Attorney, Agent, or Firm* — Finnegan, Henderson, Farabow, Garrett & Dunner, LLP (57) ABSTRACT

Provided is a method for manufacturing a fiber reinforced resin molded article capable of preventing oxidation and degradation of a liner making up a preform at a high temperature, and such a manufacturing device thereof. Prior to pouring resin into a mold, the method fills inert gas (nitrogen gas, for example) into the mold. After filling inert gas (nitrogen gas, for example) into the mold, the method closes an upper mold (second mold) placed with a gap (second gap) with a preform (i.e., brings it closer to the preform).

3 Claims, 7 Drawing Sheets

METHOD FOR MANUFACTURING FIBER REINFORCED RESIN MOLDED ARTICLE, AND MANUFACTURING DEVICE THEREOF

CROSS REFERENCE TO RELATED APPLICATIONS

The present application claims priority from Japanese patent application JP 2020-006312 filed on Jan. 17, 2020, the entire content of which is hereby incorporated by reference into this application.

BACKGROUND

Technical Field

The present disclosure relates to methods for manufacturing fiber reinforced resin molded articles, such as a high-pressure tank that is reinforced with fibers, and manufacturing devices thereof.

Background Art

Fuel cell vehicles include a high-pressure tank (hereinafter, simply may be called a tank) that stores fuel gas such as natural gas or hydrogen gas. Such a high-pressure tank is prepared as a fiber reinforced resin molded article that includes a hollow liner having a gas barrier property as a core member, and carbon fiber reinforced plastic or glass fiber reinforced plastic (hereinafter collectively called a fiber reinforced resin layer) that coats the liner. For lightweight, a hollow container made of resin is typically used as the liner.

High-pressure tanks have been conventionally manufactured by the filament winding (FW) method and the resin transfer molding (RTM) method. JP 2019-056415 A, for example, discloses a method for manufacturing a high-pressure tank by the RTM method. This manufacturing method places a preform in a mold, the preform including a liner defining the inner space of the high-pressure tank and a fiber layer formed on the outer surface of the liner, and rotates the preform in the mold in the circumferential direction about the central axis of the preform while injecting resin from a gate toward the preform placed in the mold.

SUMMARY

In the manufacturing method by the RTM method, high-temperature resin is injected (poured) into the mold and the resin is impregnated into the inner layer of the resin layer (bundle) of the preform. Thus, the liner may undergo oxidation and degrade at a high temperature.

In view of the above problems, the present disclosure provides a method for manufacturing a fiber reinforced resin molded article capable of preventing oxidation and degradation of a liner making up a preform at a high temperature, and such a manufacturing device thereof.

According to one aspect of the present disclosure, there is disclosed a method for manufacturing a fiber reinforced resin molded article to form a preform including a fiber layer on an outer surface of a hollow liner, impregnate the fiber layer of the preform with resin, and cure the resin, and the method includes a step of placing the preform in a mold while applying internal pressure to the preform; a step of vacuum degassing the mold; a step of filling inert gas into the mold; and a step of pouring resin into the mold to impregnate the fiber layer with the resin.

In some embodiments, the mold includes a first mold and a second mold; in the step of placing the preform in the mold, the preform is placed between the first mold and the second mold so as to define a first gap between the first mold and the preform and a second gap between the second mold and the preform, the second gap being larger than the first gap; and in the step of filling inert gas into the mold, the inert gas is filled toward the second gap in the mold. The method further includes a step of bringing the second mold close to the preform to pressurize and fill the inert gas in the mold after the step of filling inert gas into the mold and before the step of pouring resin into the mold.

In some embodiments, internal pressure is applied to the preform with inert gas.

According to another aspect of the present disclosure, there is disclosed a device for manufacturing a fiber reinforced resin molded article to form a preform including a fiber layer on an outer surface of a hollow liner, impregnate the fiber layer of the preform with resin, and cure the resin, and the device includes: a mold; a driving mechanism configured to drive the mold in an opening direction and a closing direction; a vacuum degassing mechanism configured to vacuum degas the mold; an inert gas filling mechanism configured to fill inert gas into the mold; a resin pouring mechanism configured to pour resin into the mold; an internal pressure applying mechanism configured to apply internal pressure to the preform; and a control device configured to control operating states of the driving mechanism, the vacuum degassing mechanism, the inert gas filling mechanism, the resin pouring mechanism, and the internal pressure applying mechanism. The control device is configured to control the driving mechanism to place the preform in the mold while controlling the internal pressure applying mechanism to apply internal pressure to the preform; control the vacuum degassing mechanism to vacuum degas the mold; control the inert gas filling mechanism to fill inert gas into the mold; and control the resin pouring mechanism to pour the resin into the mold to impregnate the fiber layer with the resin.

In some embodiments, the mold includes a first mold and a second mold; and the control device is configured to, when placing the preform in the mold, control the driving mechanism to place the preform between the first mold and the second mold so as to define a first gap between the first mold and the preform and a second gap between the second mold and the preform, the second gap being larger than the first gap; when filling inert gas into the mold, control the inert gas filling mechanism to fill the inert gas toward the second gap in the mold; and after filling inert gas into the mold and before pouring resin into the mold, control the driving mechanism to bring the second mold close to the preform to pressurize and fill the inert gas in the mold.

In some embodiments, the internal pressure applying mechanism is configured to apply internal pressure to the preform with inert gas.

According to one aspect of the present disclosure, by filling inert gas (nitrogen gas, for example) into the mold before pouring resin, it is possible to prevent oxidation and degradation of the liner at a high temperature even when the high-temperature resin is poured.

DETAILED DESCRIPTION

The following describes one embodiment of the present disclosure, with reference to the attached drawings.

The following describes a high-pressure tank for fuel cell vehicles that is one example of a fiber reinforced resin molded article. The fiber reinforced resin molded article, to which the present disclosure is applied, is not limited to the high-pressure tank for fuel cell vehicles. The shape, the material, etc. of the liner and the preform of the fiber reinforced resin molded article are also not limited to the illustrated example.

The RTM method wraps (winds) carbon fiber around a liner multiple times (in multiple layers) to form a preform with a fiber layer on the outer surface of the liner, impregnates the fiber layer of the preform with epoxy resin, and cures the epoxy resin. In this way, the RTM method manufactures a high-pressure tank for fuel cell vehicles including a fiber reinforced resin layer including the carbon fiber and the epoxy resin on the outer periphery of the liner. The liner is a hollow container made of resin (for example, nylon resin) that defines the inner space of the high-pressure tank.

In such a high-pressure tank for fuel cell vehicle, the carbon fiber is laminated thickly, and so the resin hardly enters into the inner layer of the carbon fiber unless the resin is poured at high pressure. For this reason, the tank itself is subjected to high pressure and may have some defects such as low quality and low performance due to the deformation of the tank or the liner, for example. In particular, the vicinity of a gate is subjected to high temperature and high pressure, and the portion tends to be deformed, for example. That is, since the high-pressure tank for fuel cell vehicle has the carbon fiber that is laminated very thickly (about 10 times that of a typical RTM molded shell, exterior component) to keep enough strength and it is difficult to impregnate the fiber with resin, and particularly the vicinity of the gate is partly subjected to high pressure according to the resin pouring pressure, the tank tends to have low quality and low performance due to, for example, the deformation of the tank and a resin liner inside of the tank. Furthermore, when the liner inside of the tank is made of resin, the tank may particularly be affected greatly by the resin pouring at high temperature and high pressure (e.g., oxidation and degradation tend to occur at high temperature and high pressure) and may have low quality and low performance due to the deformation of the tank and the resin liner itself inside of the tank as well as oxidation and degradation of the liner, for example. Unfortunately, these problems would not be effectively solved even by providing a rib or increasing the thickness for greater rigidity. In addition, it is difficult to control the resin temperature during molding since the resin temperature rapidly increases in response to the curing reaction of epoxy resin, for example.

To avoid this, the present embodiment has the following configuration.

[Manufacturing Device of High-Pressure Tank]

Figure 1:
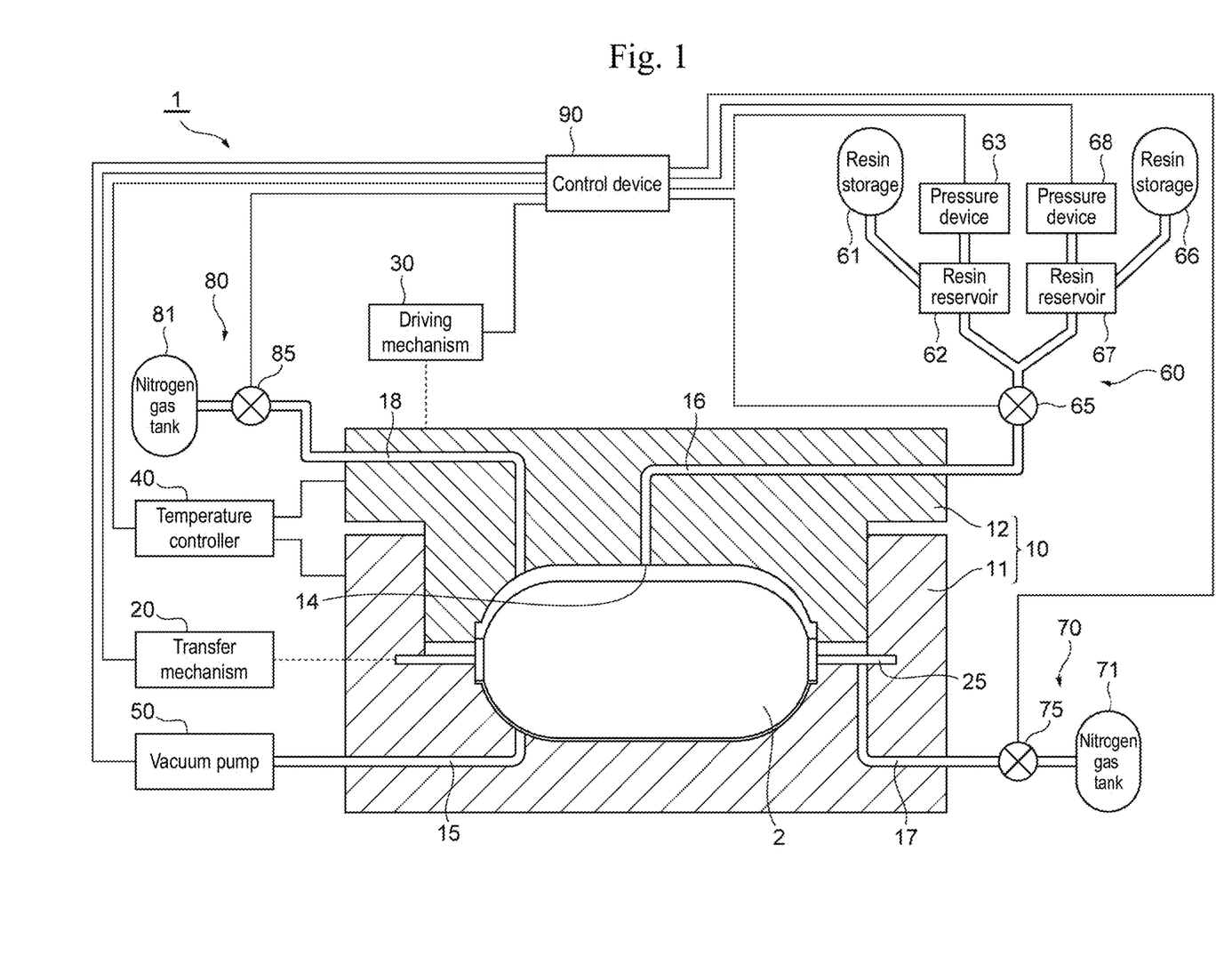
FIG. 1 is a vertical cross-sectional view of a manufacturing device of a high-pressure tank (fiber reinforced resin molded article) according to one embodiment.

FIG. 1 is a vertical cross-sectional view showing a manufacturing device of a high-pressure tank that is an example of a fiber reinforced resin molded article according to this embodiment.

A preform 2 as an intermediate body of the high-pressure tank to be manufactured in the present embodiment includes a liner and a fiber layer formed on the outer surface of the liner to be integrated with the liner. The liner is a resin hollow container having a gas barrier property and defining an inner space of the high-pressure tank. In one example, the hollow (that is, tubular) liner has a thickness of about 0.5 mm to 1 mm. In one example, the fiber layer has a thickness of about 15 mm to 30 mm. The fiber layer is formed by wrapping fibers around the outer surface of the liner multiple times by the filament winding method.

Examples of the fiber wound around the liner include carbon fiber, glass fiber, and aramid fiber. The fibers may include continuous fibers, or include long fibers or short fibers. As described later, the fiber (layer) wound around the liner is impregnated with resin and cured to form a fiber reinforced resin layer that coats the periphery of the liner. Examples of the resin include thermosetting resins, such as epoxy resins, unsaturated polyester resins, and polyamide resins, and thermoplastic resins, such as polyethylene resins and polyester resins.

Figure 6:
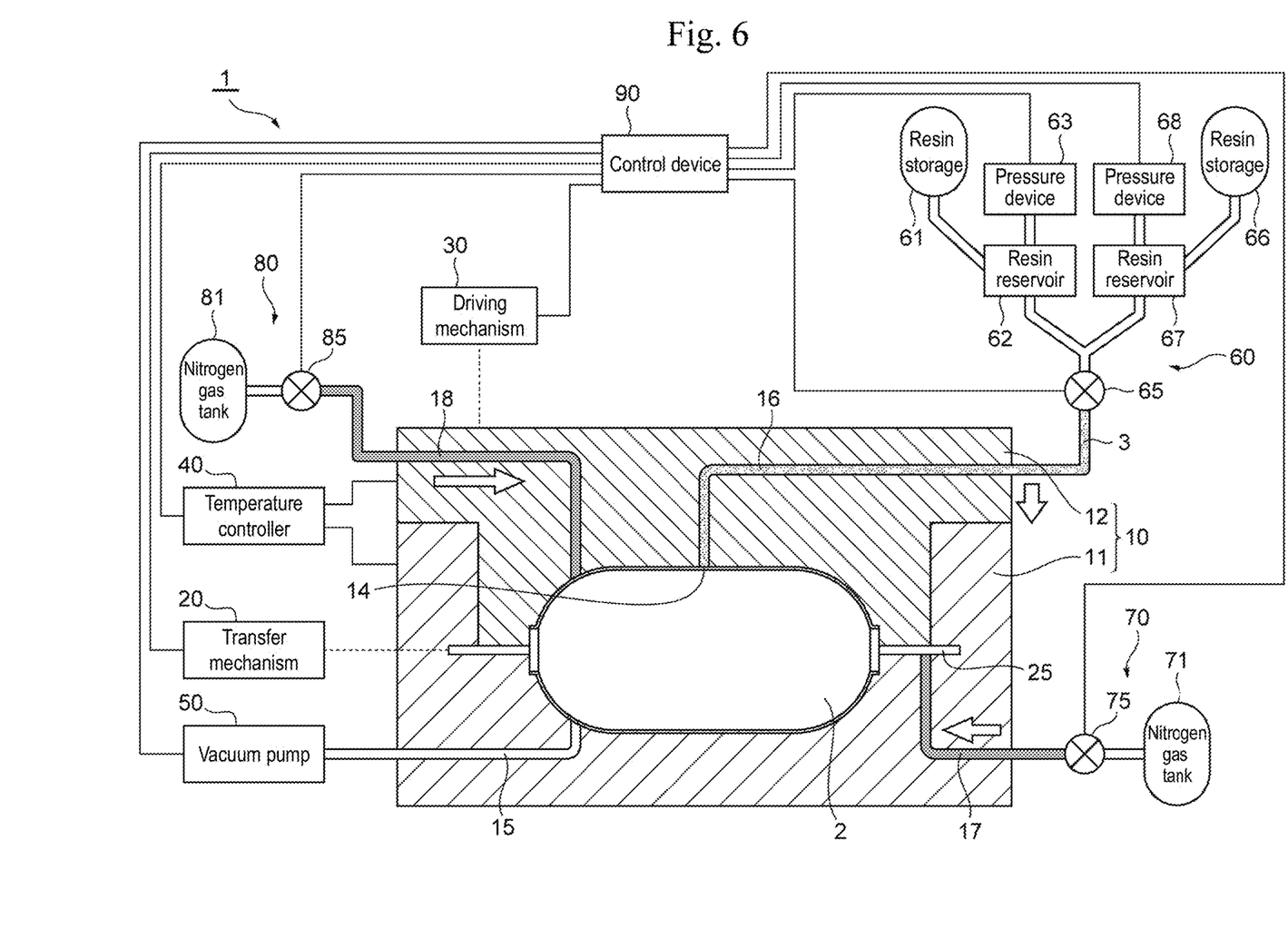
FIG. 6 is a vertical cross-sectional view of the manufacturing device of a high-pressure tank, showing a fully tightening step and a resin pouring step according to one embodiment.

A manufacturing device 1 is configured to manufacture a high-pressure tank by the RTM method to impregnate the fiber layer making up the preform 2 with resin 3 (reference numeral is shown in FIG. 6, for example) and cure the impregnated resin 3.

The manufacturing device 1 includes a mold 10 made up of a plurality of molds, such as a lower mold 11 as a fixed mold and an upper mold 12 as a moving mold. Closing of these lower mold 11 and upper mold 12 (this may be called mold clamping) defines a cavity for the fiber reinforced resin layer. To place the preform 2 having the lamination of fiber in the mold 10, the cavity of the mold 10 is made larger by the tolerance of the preform 2, for example.

This embodiment includes the lower mold 11 as a fixed mold and the upper mold 12 as a moving mold (a mold that is movable relative to the fixed mold). In another embodiment, the upper mold 12 may be a fixed mold and the lower mold 11 may be a moving mold, or both of the lower mold 11 and the upper mold 12 may be movable. The mold 10 in this embodiment includes two parts of the lower mold 11 and the upper mold 12, which may be three or more of parts.

In the mold 10, the preform 2 is supported by a hollow shaft 25 that is disposed along the axis of the liner. That is, the shaft 25 constitutes a support mechanism that supports the preform 2 in the mold 10 (in the cavity).

A vacuum degassing pipe 15 is embedded in the mold 10 (in the lower mold 11 in the illustrated example). The vacuum degassing pipe 15 connects to a vacuum pump 50. The vacuum pump 50 operates to degas (evacuate) the mold 10 (the cavity) via the vacuum degassing pipe 15. That is, the vacuum pump 50 and the vacuum degassing pipe 15 constitute a vacuum degassing mechanism for vacuum degas of the mold 10 (the cavity).

In the mold 10 (in the upper mold 12 in the illustrated example), a resin pouring pipe 16 is embedded, which defines a gate (resin inlet) 14 that opens to the cavity. In this example, the gate 14 is at a position facing a central portion (in the axial direction) of the preform 2. The resin pouring pipe 16 connects to a resin injector 60. The resin injector 60 pours (supplies) resin 3 into the mold 10 (cavity) via the gate 14 through the resin pouring pipe 16. That is, the resin injector 60 and the resin pouring pipe 16 constitute a resin pouring mechanism for pouring of the resin 3 into the mold 10 (cavity). In one example, the resin 3 is a two-component thermosetting epoxy resin composed of a base resin and a curing agent. The resin injector 60 therefore includes a resin storage 61, a resin reservoir 62, and a pressure device 63 for the base resin, a resin storage 66, a resin reservoir 67, and a pressure device 68 for the curing agent, and a valve 65 to supply the resin 3, which is a mixture of the base resin and the curing agent, to the resin pouring pipe 16.

In this example, a tank nitrogen gas purge pipe 17 is embedded in the mold 10 (lower mold 11 in the illustrated example). The tank nitrogen gas purge pipe 17 connects to a nitrogen gas purge device 70. The nitrogen gas purge device 70 can purge (pressurize and fill) nitrogen gas into the preform 2 (or the liner thereof) through the tank nitrogen gas purge pipe 17 (and the hollow shaft 25), and apply internal pressure to the preform 2 (or the liner thereof). That is, the nitrogen gas purge device 70 and the tank nitrogen gas purge pipe 17 constitute an internal pressure applying mechanism for applying internal pressure to the preform 2 (or the liner thereof). The nitrogen gas purge device 70 in this example includes a nitrogen gas tank 71 provided with a pressure regulating valve 75.

A mold nitrogen gas purge pipe 18 is embedded in the mold 10 (upper mold 12 in the illustrated example). The mold nitrogen gas purge pipe 18 connects to a nitrogen gas purge device 80. The nitrogen gas purge device 80 can purge (pressurize and fill) nitrogen gas into the mold 10 (i.e., the outside of the preform 2 placed in the mold 10) through the mold nitrogen gas purge pipe 18. That is, the nitrogen gas purge device 80 and the mold nitrogen gas purge pipe 18 constitute a nitrogen gas (inert gas) filling mechanism for purging (pressurize and fill) nitrogen gas into the mold 10. The nitrogen gas purge device 80 in this example includes a nitrogen gas tank 81 provided with a pressure regulating valve 85.

It should be noted that although nitrogen gas is used in this example, it is needless to mention that an inert gas other than the nitrogen gas may be used.

The manufacturing device 1 includes: a transfer mechanism 20 to transfer the preform 2 to a predetermined position; a driving mechanism 30 to drive the mold 10 (specifically, the upper mold 12) in the direction to open and close the mold 10 (vertical direction); a temperature controller 40 to control the temperature of the mold 10 (lower mold 11, upper mold 12); and a control device 90 as a controller to control the operating states of the entire manufacturing device 1 (specifically, the operating states of the transport mechanism 20, the driving mechanism 30, the temperature controller 40, the vacuum pump 50 in the vacuum degassing mechanism, the pressure devices 63 and 68 and the valve 65 of the resin injector 60 in the resin pouring mechanism, the pressure regulating valve 75 of the nitrogen gas purge device 70 in the internal pressure applying mechanism, and the pressure regulating valve 85 of the nitrogen gas purge device 80 in the nitrogen gas (inert gas) filling mechanism).

[Method for Manufacturing a High-Pressure Tank]

Figure 2:
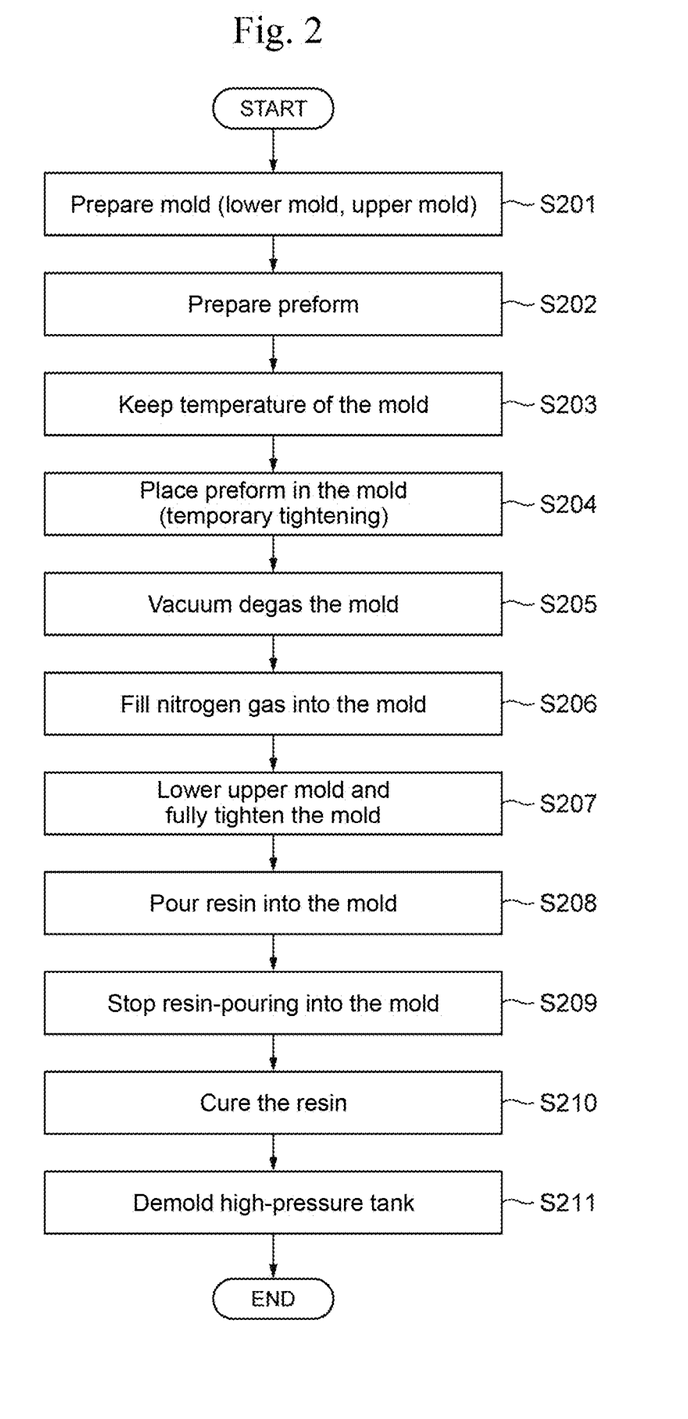
FIG. 2 is a flowchart of a method for manufacturing a high-pressure tank (fiber reinforced resin molded article) according to one embodiment.

FIG. 2 is a flowchart illustrating a method for manufacturing a high-pressure tank as an example of the fiber reinforced resin molded article according to one embodiment. FIG. 3 to FIG. 7 are vertical cross-sectional views respectively showing a preform placing step, a vacuum degassing step, a mold nitrogen gas purge step, a fully tightening step and a resin pouring step, and a resin-pouring stop step and a resin curing step.

(Mold Preparation Step: S201)

Firstly, the method prepares the mold 10 including the lower mold 11 and the upper mold 12 having the above-described structure.

(Preform Preparation Step: S202)

As described above, the method prepares the preform 2 beforehand, in which a fiber layer is formed by wrapping (winding) fiber around the outer surface of the hollow liner.

(Mold Temperature-Retention Step: S203)

Next, the method makes the control device 90 control the temperature controller 40 so as to keep the temperature of the mold 10 (lower mold 11, upper mold 12) to a predetermined temperature. When the resin 3 is a thermosetting resin, this predetermined temperature is equal to or higher than the curing temperature of the resin 3.

The method in this example keeps the temperature of the mold 10 to be the curing temperature of the resin 3 or higher at the beginning. In another example, the temperature of the mold 10 may be kept to be less than the curing temperature of the resin 3 at the beginning, and at an appropriate timing in a step described later (e.g., after pouring the resin 3 and completing impregnation of the lamination with the resin 3), the temperature of the mold 10 may be kept to be the curing temperature or higher of the resin 3.

(Preform Placing Step: S204)

Figure 3:
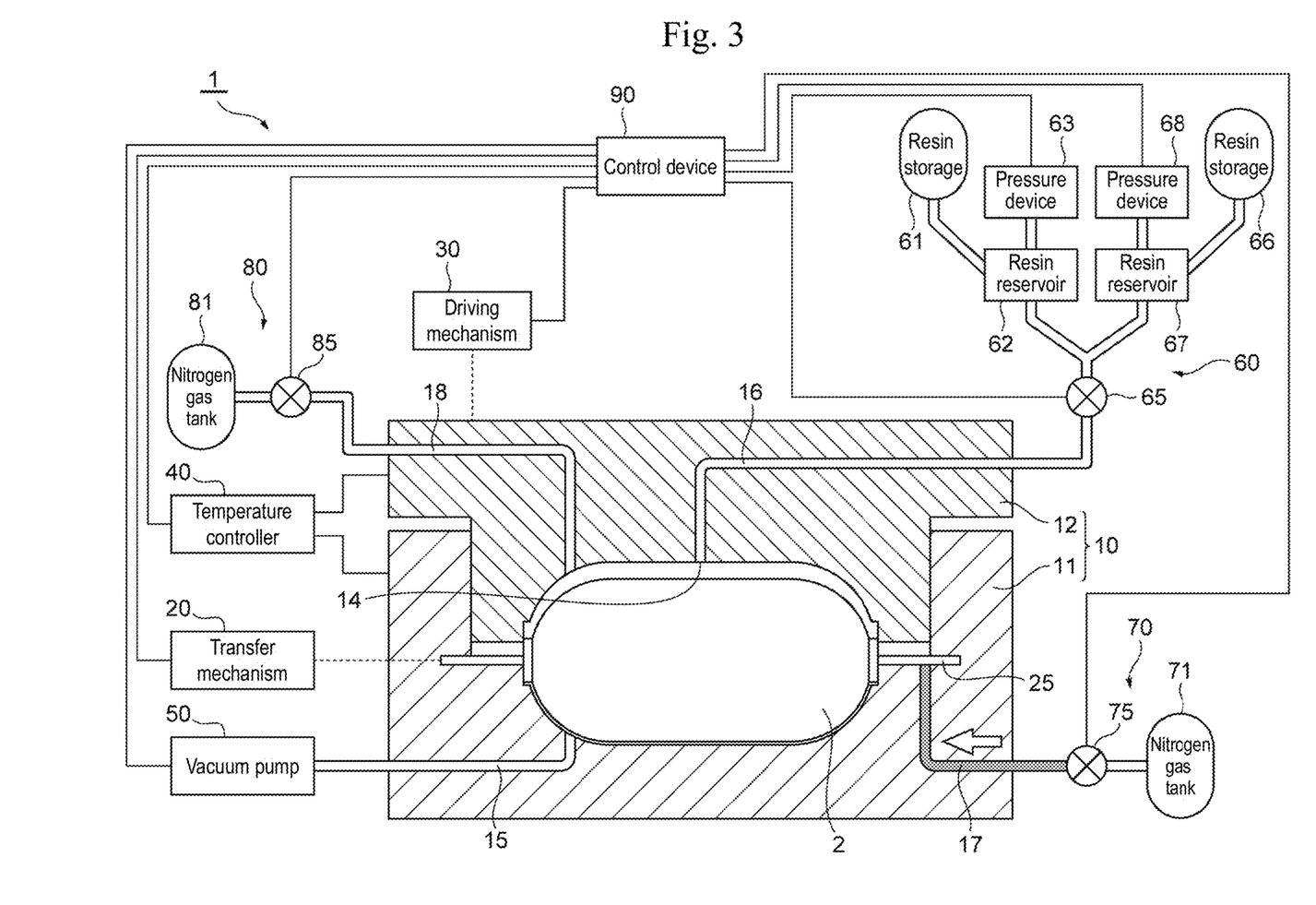
FIG. 3 is a vertical cross-sectional view of the manufacturing device of a high-pressure tank, showing a preform placing step according to one embodiment.

Subsequently, the control device 90 controls the transfer mechanism 20 and the driving mechanism 30 to place the preform 2 in the mold 10 (that is, between the lower mold 11 and the upper mold 12) (FIG. 1, FIG. 3). At this time, the control device 90 opens the pressure regulating valve 75 of the nitrogen gas purge device 70 so as to purge (pressurize and fill) nitrogen gas into the preform 2 (or the liner thereof) from the nitrogen gas tank 71 and apply internal pressure to the preform 2 (or the liner thereof) with nitrogen gas. Specifically, while the upper mold 12 is open, the transfer mechanism 20 places the preform 2 on the lower mold 11 under the control of the control device 90. At this time, the shaft 25 supports the preform 2. After that, the pressure regulating valve 75 of the nitrogen gas purge device 70 is opened under the control of the control device 90, and while purging (pressurizing and filling) nitrogen gas into the preform 2 (or the liner thereof) from the nitrogen gas tank 71 to apply internal pressure to the preform 2 (or the liner thereof) at a predetermined pressure with nitrogen gas, the drive mechanism 30 starts mold clamping under the control of the control device 90 and temporarily tightens the upper mold 12. Temporary tightening is an intermediate state between the state where the upper mold 12 is open and the fully tightening state, and the lower mold 11 and the upper mold 12 have a gap therebetween in the temporary tightening state. As shown in FIG. 3, the upper mold 12 moves to a position having a gap (second gap) of several mm with the preform 2. This gap (second gap) between the upper mold 12 and the preform 2 is larger than a gap (first gap) between the lower mold 11 and the preform 2.

(Vacuum Degassing Step: S205)

Figure 4:
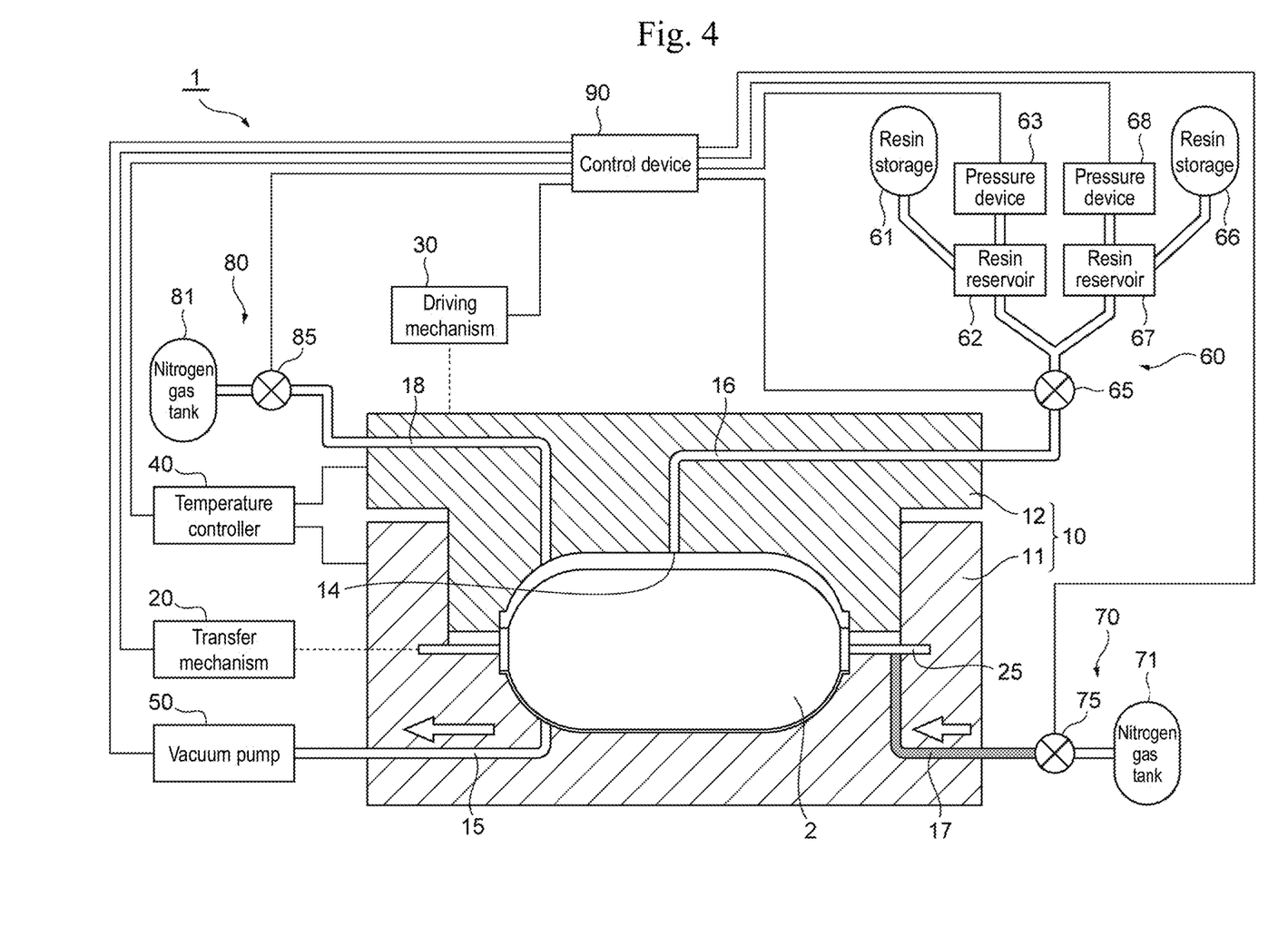
FIG. 4 is a vertical cross-sectional view of the manufacturing device of a high-pressure tank, showing a vacuum degassing step according to one embodiment.

Next, the control device 90 controls the vacuum pump 50 while keeping the above-mentioned temporary tightening state (i.e., before completion of mold clamping) to degas the mold 10 while maintaining the pressurizing of the inside of the preform 2 (or the liner thereof) with nitrogen gas (FIG. 4).

(Mold Nitrogen Gas Purge Step: S206)

Figure 5:
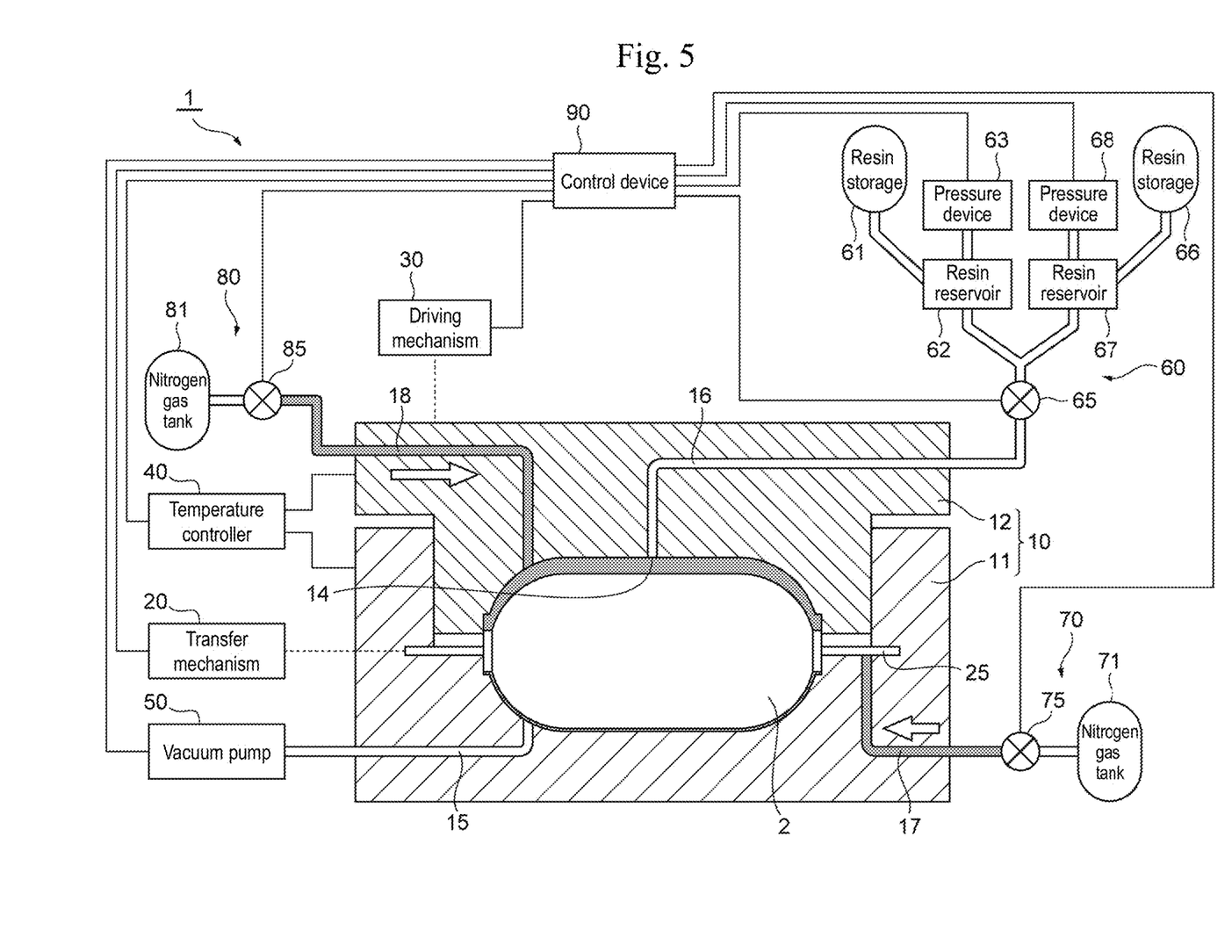
FIG. 5 is a vertical cross-sectional view of the manufacturing device of a high-pressure tank, showing a mold nitrogen gas purge step according to one embodiment.

After stopping (or completion of) the above-stated vacuum degassing, the control device 90 opens the pressure regulating valve 85 of the nitrogen gas purge device 80 so as to purge (pressurize and fill) nitrogen gas into the mold 10 from the nitrogen gas tank 81 at a predetermined pressure (FIG. 5). Since the upper mold 12 is temporary tightening, nitrogen gas is ejected toward (i.e., pressurized and filled into) the gap (second gap) formed between the upper mold 12 and the (upper face of) preform 2.

(Fully Tightening Step: S207)

Next, while purging nitrogen gas into the mold 10, the control device 90 controls the driving mechanism 30 to lower the upper mold 12 to the lower end to completely close the upper mold 12 (i.e., bring it closer to the preform 2) and completely close (fully tightening) the upper mold 12 and the lower mold 11 (FIG. 6). This allows the lamination of the fiber layer of the preform 2 to be filled with nitrogen gas.

(Resin Pouring Step: S208)

After filling the lamination of the fiber layer of the preform 2 with nitrogen gas, the resin 3 is injected/poured into the mold 10 (FIG. 6). Specifically, the control device 90 opens the valve 65, pressurizes the base resin stored in the resin reservoir 62 with the pressure device 63, and pressurizes the curing agent stored in the resin reservoir 67 with the pressure device 68 to mix the base resin and the curing agent and prepare (uncured) resin 3. This lets the (uncured) resin 3 flow through the resin pouring pipe 16 in the upper mold 12, so that the resin 3 is injected/poured toward the preform 2 via the gate 14 (in the illustrated example, the gate at the central portion of the preform 2), and is impregnated into the lamination of the fiber layer of the preform 2.

(Resin-Pouring Stop Step: S209)

Figure 7:
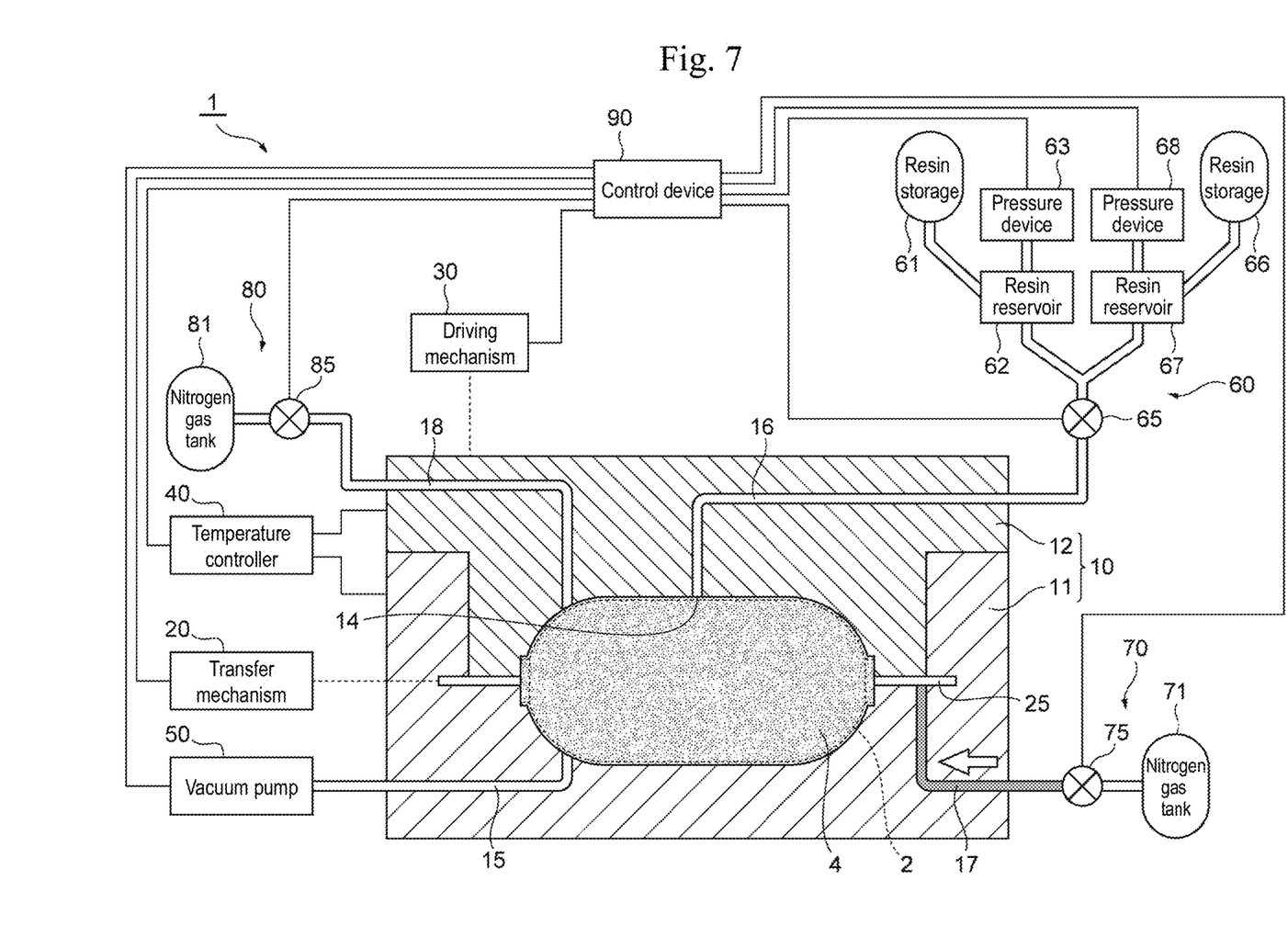
FIG. 7 is a vertical cross-sectional view of the manufacturing device of a high-pressure tank, showing a resin-pouring stop step and a resin curing step according to one embodiment.

After the lamination of the fiber layer of the preform 2 is completely impregnated with the resin 3 and the resin 3 stops curing and generating heat, the pouring of the resin 3 stops (FIG. 7).

(Resin Curing Step: S210)

After the pouring of the resin 3 stops as stated above, the method cures the resin 3 (FIG. 7).

(Demolding Step: S211)

After the resin 3 is cured, the control device 90 controls the driving mechanism 30 to open the upper mold 12. When the curing of the resin 3 ends, a high-pressure tank 4 having the fiber reinforced resin layer formed on the outer periphery of the liner is obtained.

As described above, when a high-pressure tank for fuel cell vehicles is manufactured by the RTM impregnation technology, in order to impregnate epoxy resin into carbon fiber and cure the epoxy resin, it is needed to set the mold temperature as well as the curing and heat generation temperature of the resin at low temperatures in consideration of the heat-resistant temperature of the resin liner that may undergo oxidation and degrade. This is one of the factors of low productivity and high costs.

In order to prevent oxidation and degradation of a resin liner at a high temperature while pressure is applied to the resin liner in the resin transfer molding, the present embodiment performs molding while purging nitrogen gas inside and outside of the resin liner.

In the resin transfer molding, in order to prevent the liner from being deformed due to the pressure in the pouring of epoxy resin, the present embodiment applies internal pressure from the interior of the liner with nitrogen gas, and in order to prevent oxidation and degradation of the exterior of the liner when high-temperature resin is poured into the RTM mold, the present embodiment purges nitrogen gas into a gap formed between the upper mold 12 and the tank (preform 2) before pouring the resin, and then closes the upper mold 12, and also fill the lamination of carbon fiber with nitrogen gas, and then pours high-temperature epoxy resin and impregnates the resin into the mold, so as to prevent oxidation and degradation of the interior and the exterior of the resin liner.

Since the molding in the present embodiment is high-cycle molding, even if the mold temperature and the resin temperature are high, the quality of the resin liner and the tank performance can be maintained, and thus the present embodiment can manufacture a high-pressure tank that achieves high performance and increased productivity at very low cost. Furthermore, the present embodiment can avoid defects of the high-pressure tank accompanied by change in the shape, such as addition of a rib to the tank or the liner for greater rigidity. In addition, the present embodiment can avoid problems, such as cost increase resulting from the increased thickness of the liner, reduction of the amount of hydrogen stored, or low physical properties (e.g., elasticity).

Accordingly, when epoxy resin is impregnated by the RTM impregnation technology, the present embodiment can avoid deformation, low quality, or low performance of the resin liner by preventing oxidation and degradation of the resin liner even if the mold temperature and the resin temperature are high, and therefore can mold a high-pressure tank that achieves high performance and increased productivity at low cost.

As described above, by filling inert gas (nitrogen gas, for example) into the mold 10 before pouring the resin 3, the present embodiment can prevent oxidation and degradation of the liner at a high temperature even when the high-temperature resin 3 is poured.

Furthermore, by filling inert gas (nitrogen gas, for example) into the mold 10 and then closing the upper mold (second mold) 12 placed with a gap (second gap) with the preform 2 (i.e., bringing it closer to the preform 2), the inert gas (nitrogen gas, for example) in the mold 10 is pressurized and filled also into the inner part of the fiber layer, and thus the present embodiment can certainly prevent oxidation and degradation of the liner at a high temperature.

In addition, by applying internal pressure to the preform 2 with inert gas (nitrogen gas, for example), the present embodiment can prevent oxidation and degradation of the interior of the liner.

That is a detailed description of the embodiment of the present disclosure referring to the drawings. The specific configuration of the present disclosure is not limited to the above-stated embodiment, and the design may be modified variously without departing from the spirits of the present disclosure. The present disclosure covers such modified embodiments.

DESCRIPTION OF SYMBOLS

1 Manufacturing device of high-pressure tank (fiber reinforced resin molded article)

2 Preform
3 Resin
4 High-pressure tank (fiber reinforced resin molded article)
10 Mold
11 Lower mold (first mold)
12 Upper mold (second mold)
14 Gate (resin inlet)
15 Vacuum degassing pipe (vacuum degassing mechanism)
16 Resin pouring pipe (resin pouring mechanism)
17 Tank nitrogen gas purge pipe (internal pressure applying mechanism)
18 Mold nitrogen gas purge pipe (nitrogen gas (inert gas) filling mechanism)
20 Transfer mechanism
25 Shaft
30 Driving mechanism
40 Temperature controller
50 Vacuum pump (vacuum degassing mechanism)
60 Resin injector (resin pouring mechanism)
61, 66 Resin storage
62, 67 Resin reservoir
63, 68 Pressure device
65 Valve
70 Nitrogen gas purge device (internal pressure applying mechanism)
71 Nitrogen gas tank
75 Pressure regulating valve
80 Nitrogen gas purge device (nitrogen gas (inert gas) filling mechanism)
81 Nitrogen gas tank
85 Pressure regulating valve
90 Control device

What is claimed is:

1. A method for manufacturing a fiber reinforced resin molded article, the method including forming a preform including a fiber layer on an outer surface of a hollow liner, impregnating the fiber layer of the preform with resin, and curing the resin, comprising:
   a step of placing the preform in a mold while applying internal pressure to the preform;
   a step of vacuum degassing the mold;
   a step of filling inert gas into the mold;
   a step of pouring resin into the mold to impregnate the fiber layer with the resin, wherein
   the mold includes a first mold and a second mold;
   in the step of placing the preform in the mold, the preform is placed between the first mold and the second mold so as to define a first gap between the first mold and the preform and a second gap between the second mold and the preform, the second gap being larger than the first gap; and
   in the step of filling inert gas into the mold, the inert gas is filled toward the second gap in the mold, the method further comprising
   a step of bringing the second mold close to the preform to pressurize and fill the inert gas in the mold after the step of filling inert gas into the mold and before the step of pouring resin into the mold.

2. The method for manufacturing a fiber reinforced resin molded article according to claim 1, wherein internal pressure is applied to the preform with inert gas.

3. The method for manufacturing a fiber reinforced resin molded article according to claim 1, wherein:
   the liner is made of resin; and
   the resin includes a thermosetting resin.

* * * * *